(12) United States Patent
Tailor et al.

(10) Patent No.: US 8,331,319 B2
(45) Date of Patent: Dec. 11, 2012

(54) OPTIMIZING HANDOVERS IN A COMMUNICATION NETWORK

(75) Inventors: PinalKumari K. Tailor, Ashburn, VA (US); Esmail Hejazi Dinan, Herndon, VA (US); Hetal J. Mistry, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 754 days.

(21) Appl. No.: 12/487,905

(22) Filed: Jun. 19, 2009

(65) Prior Publication Data

US 2010/0323704 A1 Dec. 23, 2010

(51) Int. Cl.
*H04W 4/00* (2009.01)
*H04W 36/00* (2009.01)
(52) U.S. Cl. ........................ 370/331; 455/443
(58) Field of Classification Search ........................ None
See application file for complete search history.

(56) References Cited

U.S. PATENT DOCUMENTS

| | | | | |
|---|---|---|---|---|
| 6,131,029 A * | 10/2000 | Roberts | .......................... | 455/438 |
| 7,979,072 B2 * | 7/2011 | Senarath et al. | .............. | 455/442 |
| 2003/0031201 A1 * | 2/2003 | Choi | ............................. | 370/468 |
| 2007/0177510 A1 * | 8/2007 | Natarajan et al. | ............. | 370/238 |
| 2007/0218903 A1 * | 9/2007 | Grech | ........................... | 455/436 |
| 2010/0118705 A1 * | 5/2010 | Mehrotra et al. | ............. | 370/237 |

* cited by examiner

*Primary Examiner* — Eunsook Choi
(74) *Attorney, Agent, or Firm* — O'Brien Jones, PLLC (57) ABSTRACT

Systems, methods, and software are provided to manage a handover of a mobile communication device from a source base station to a target base station. In an embodiment, a method comprises exchanging wireless communications between a plurality of mobile communication devices and a first base station system, processing the communications to determine a plurality of mobility profiles associated with the plurality of mobile communication devices served by the first base station system. A handover request to handover a mobile communication device from a second base station system to the first base station system is received. The plurality of mobility profiles are processed to select a candidate mobile communication device from the plurality of mobile communication devices. A handover of the candidate mobile communication device is initiated from the first base station system to a target base station system.

21 Claims, 7 Drawing Sheets

OPTIMIZING HANDOVERS IN A COMMUNICATION NETWORK

TECHNICAL FIELD

This invention is related to the field of communications, and in particular, to a method of managing handovers based on various optimization factors.

TECHNICAL BACKGROUND

Wireless communication services have evolved dramatically from the first voice only cellular telephone systems to high-speed digital data networks capable of delivering voice, Internet, and even streaming video content to mobile devices. Users may access wireless communication services using a wide variety of mobile devices, such as mobile phones, personal computers, personal digital assistants, laptops and personal media devices, as well as other types of mobile communication devices. Accordingly, users have come to appreciate and rely upon the mobility provided by wireless communication services.

In a typical wireless environment, the provisioning and delivery of wireless communication services requires many different components. For example, a wireless communication service area can be defined by a radio frequency (RF) pattern generated by RF transmissions from a nearby base transceiver station or base station. The base station is frequently linked to communication networks via a backhaul link. The mobile communication device establishes a communication path via the base station to other communication networks to obtain wireless access to communication services, such as voice, video, and data services.

Many factors can influence the quality of a service session, such as, the radio interface traffic, wireless load, the carrier or signal to noise ratio from nearby base stations, among other things. Increasingly, the mobility of mobile communication devices between adjacent or neighboring base stations, the types of communications of the various mobile communication devices within a base station's cell area (e.g., voice, video streaming or data transferring) and the condition of the backhaul link of a base station may influence the overall quality of a particular service session. For example, a call may be dropped if the backhaul link lacks sufficient capacity for the call session. In another example, a high speed video service may be degraded if the backhaul link is or becomes congested. In another example, a call may be dropped or data transmissions may be degraded as a call is handed over to a base station that becomes overloaded or congested due to the handover.

OVERVIEW

In various embodiments, systems, methods, and software are provided to manage a handover of a mobile communication device from a source base station to a target base station. In an embodiment, a method comprises exchanging wireless communications between a plurality of mobile communication devices and a first base station system, processing the communications to determine a plurality of mobility profiles associated with the plurality of mobile communication devices served by the first base station system. A handover request to handover a mobile communication device from a second base station system to the first base station system is received. In response to the handover request, the plurality of mobility profiles are processed to select a candidate mobile communication device from the plurality of mobile communication devices. A handover of the candidate mobile communication device is initiated from the first base station system to a target base station system.

In another embodiment, a communication system comprises a processing system and an interface. The processing system exchanges communications between a plurality of mobile communication devices and a first base station. The processing system processes the communications to determine a plurality of mobility profiles associated with the plurality of mobile communication devices served by the first base station system. The processing system receives a handover request to handover a mobile communication device from a second base station system to the first base station system. In response to the handover request, the processing system processes the plurality of mobility profiles to select a candidate mobile communication device from the plurality of mobile communication devices for a potential outbound handover from the first base station. In response to determining that a handover should be initiated, the interface initiates a handover of the candidate mobile communication device from the first base station system to another base station system.

DETAILED DESCRIPTION

In order that the technical solution of the invention may be fully understood, one or more exemplary and preferred embodiments thereof will now be described with reference to the accompanying drawings. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In order to achieve wireless mobility, many complex processes must be executed by the various elements involved in providing wireless communication services. A handover (sometimes referred to as a handoff) is one such process that assists with providing wireless mobility. When a mobile communication device leaves one service area and enters another service area, a handover is executed to transfer the mobile communication device from the source base station in the first service area to a new, target base station in the second service area.

A handover decision may be made based on the relative quality of the RF transmissions from the source base station and the target base station. For instance, if the quality of the RF transmissions from the source base station becomes degraded below a threshold level, either the mobile communication device, base station or some other element in the service network may initiate a handover process to transfer the mobile communication device to the target base station.

At times, handover processes can negatively impact the quality of wireless communication services. In one example, transferring a mobile communication device participating in a high bandwidth communication session to a target base station may over burden the target base station. Moreover, the backhaul link between the target base station and the service network may become congested as a result of the transfer. It would be desirable if conditions of base stations adjacent to the target base station could be assessed and the mobility profile(s) of one or more mobile communication devices in power boundaries between the target base station and adjacent base stations were considered in order to optimize handovers of one or more mobile communication devices. In this manner, the bandwidths and backhauls in the source, target and adjacent base stations may be optimized, as well as the quality of the communication sessions of all mobile communication devices in the various base station locations.

In another example, the RF transmissions from a source base station may be above a threshold level that would trigger a handover. However, the backhaul link carrying traffic between the source base station and the access network may be congested. It would be desirable if such backhaul conditions could be alleviated, even though the quality of the RF transmissions may not require a handover, because congestion could cause jitter or delay in communications exchanged over the backhaul link.

Figure 1:
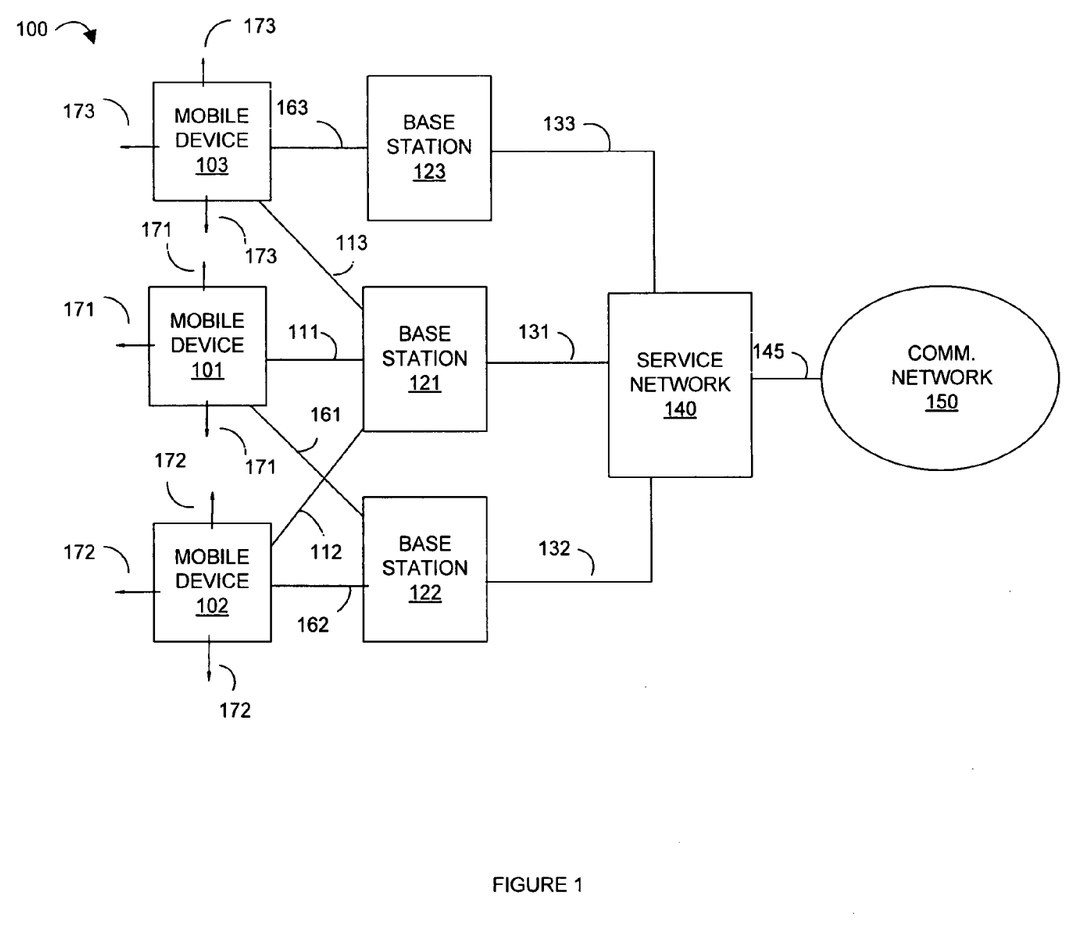
FIG. 1 is a block diagram of an embodiment of a communication network for managing handovers.

FIG. 1 is a block diagram 100 of an exemplary embodiment whereby the mobility profiles of mobile communication devices 101, 102 and 103 are considered in order to optimize handover decisions, resource utilization and load balancing among base stations. FIG. 1 includes mobile communication devices 101, 102 and 103; base stations 121, 122 and 123; service network 140, and communication network 150.

Mobile communication device 101 communicates with base station 122 over wireless link 111. Similarly, mobile communication device 101 may communicate with base station 121 over wireless link 161. Mobile communication device 101 may also communicate with base station 123 over a wireless link (not shown). Mobile communication device 102 communicates with base station 121 over wireless link 112. Similarly, mobile communication device 102 communicates with base station 122 over wireless link 162. Mobile communication device 102 may also communicate with base station 123 over a wireless link (not shown). Mobile communication device 103 communicates with base station 121 over wireless link 113. Similarly, mobile communication device 103 communicates with base station 123 over wireless link 163. Mobile communication device 103 may also communicate with base station 122 over a wireless link (not shown).

Base station 121 communicates with service network 140 over backhaul link 131. Base station 122 communicates with service network 140 over backhaul link 132. Base station 123 communicates with service network 140 over backhaul link 133. Service network 140 communicates with communication network 150 over link 145.

Mobile communication devices 101, 102 and 103 may comprise mobile communication devices capable of communicating with communication network 150 via base stations 121, 122 and 123 and service network 140. Mobile phones, computers, lap tops, digital notebooks, personal digital assistants, music players, video players, and network interface cards are examples of mobile communication devices.

Base station 121 comprises a communication system capable of communicating with mobile communication device 101, 102 or 103 over wireless links 161, 112 or 113 and service network 140 over backhaul link 131. Base station 121 may also be referred to as a radio base station or a base transceiver station (BTS).

Base station 122 comprises a communication system capable of communicating with mobile communication device 101 or 102 over wireless link 111 and 162, respectively, and service network 140 over backhaul link 132. Base station 122 may also communicate with mobile communication device 103 over a wireless link (not shown). Base station 122 may also be referred to as a radio base station or a base transceiver station.

Base station 123 comprises a communication system capable of communicating with mobile communication device 103 over wireless link 163 and service network 140 over backhaul link 133. Base station 123 may also communicate with mobile communication devices 101 or 102 over wireless links (not shown). Base station 123 may also be referred to as a radio base station or a base transceiver station.

Service network 140 comprises a communication system capable of communicating with base station 121 over backhaul link 131, base station 122 over backhaul link 132 or base station 123 over back haul link 133. Service network 140 may communicate with other base stations (not shown). Service network 140 is also capable of communicating with communication network 150 over link 145.

Communication network 150 comprises any network or collection of networks, such as a wireless communication network, a public switched telephone network, an intranet, or an internet.

In operation, mobile communication device 101 exchanges communications with base station 122. In this embodiment, base station 122 may be considered the source base station for mobile communication device 101. Base station 121 may be considered the source base station for mobile communication devices 102 and 103. Other mobile communication devices (not shown) may also exchange communications with base stations 121, 122 and 123.

Base stations 121, 122 and 123 exchange the communications with service network 140 over backhaul links 131, 132 and 133, respectively. Backhaul links 131, 132 and 133 comprise T-1 links, Ethernet links, or other types of backhaul links. Service network 140 exchanges the communications with communication network 150.

The communications may be exchanged in accordance with a wireless communications protocol, such as code division multiple access (CDMA), CDMA 2000, WCDMA, general service mobile (GSM), Wireless Fidelity (WiFi), World Wide Interoperability for Mobile Access (WiMAX), LTE or any combination or variation thereof.

During operation, mobile communication device 101 may send periodic ranging requests to scan for base stations in its vicinity. Also, the quality of communications, such as signal to noise ratio (SINR), carrier to noise ration (CINR), received signal strength indication (RSSI) and round trip delay time (RTT), among other quality metrics, may continually be monitored. Assuming mobile communication device 101 is mobile, as the quality of the communications for mobile communication device 101 being served by base station 122 degrade, for example, because mobile communication device 101 is moving farther away from base station 122, mobile communication device 101 may scan for a target base station with an appropriate power level to trigger a handoff.

If target base station 121 has an appropriate power level, mobile communication device 101 may send a mobile handoff indication message to its serving or source base station 122 and waits for the base station's response. The source base station 122 and the target base station 121 may inform each other of the handover request and the source base station 122 indicates the mobile communication device 101 to send its range request to the target base station 121 to initiate the handover.

The mobile communication device 101, optionally, sends the ranging request to the target base station 121. The target base station 121 determines the mobility profile of its existing users to determine if there are any users that would be good candidates for an outbound handover from base station 121 to a neighboring base station. If one or more users are identified as potential candidates, the target base station may handover these user(s) to the neighboring base station(s) with the shared power boundary, so that target base station 121 is able to serve mobile communication device 101's communication needs.

At times, backhaul link 131, between base station 121 and service network 140, may near full capacity. Such congestion could degrade the performance of the communication network. To avoid performance degradation, a handover of one or more of the mobile communication devices communicating with base station 121, including, for example, mobile communication device 102 and/or 103, may be initiated based on their having a relatively lower mobility profile or a lower mobility profile than mobile communication device 101, if they are within a shared power boundary with a neighboring base station (122 or 123 in this example). Such handover(s) would advantageously reduce the load on backhaul link 131.

Figure 2:
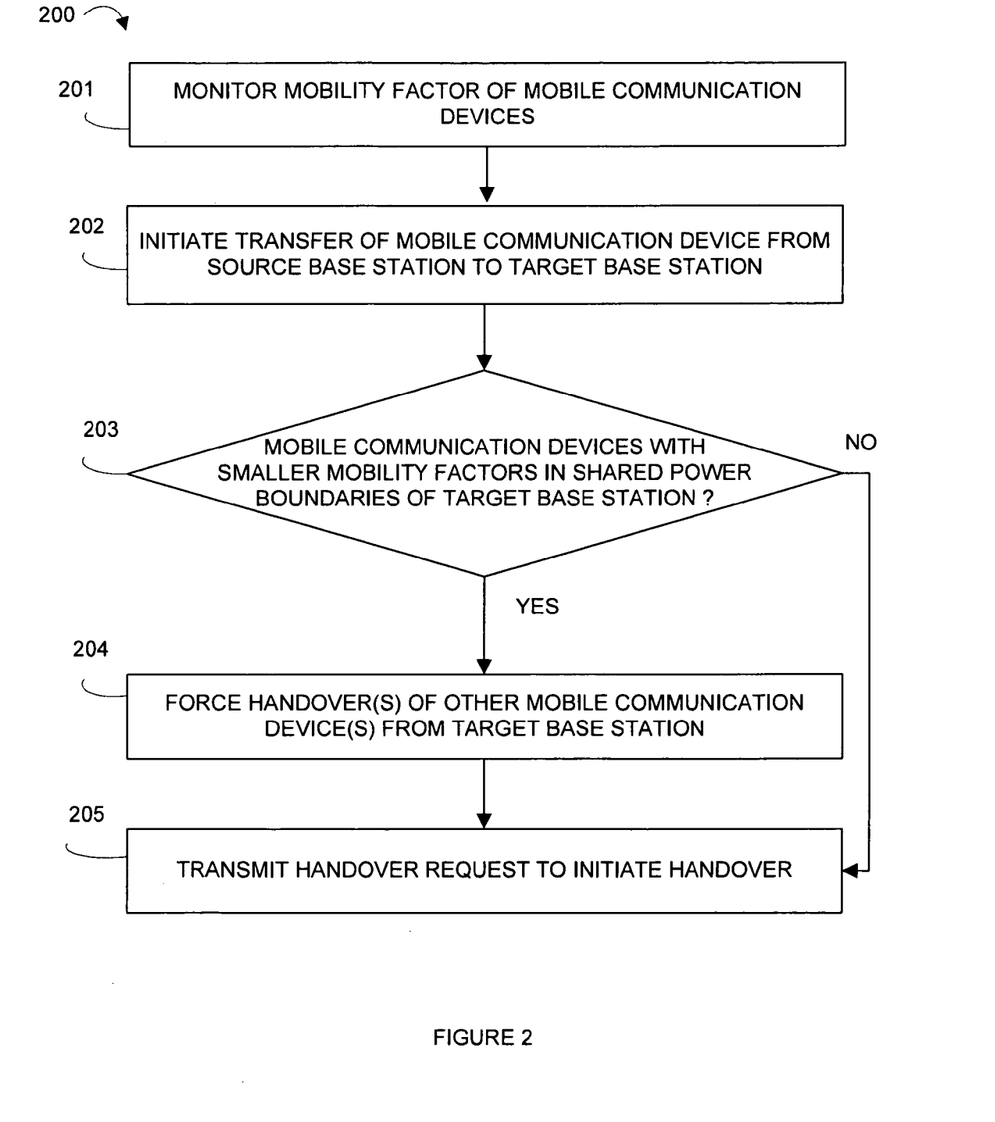
FIG. 2 illustrates a process for managing handovers in an embodiment.

FIG. 2 illustrates a process 200 that may be employed to determine if such outbound handover(s) of one or more mobile communication devices served by target base station 121 should be initiated. It should be noted that process 200 could be employed by a variety of different elements shown in FIG. 1, including mobile communication device 101, base station 121, 122 or 123, or service network 140, or any combination thereof.

The mobility profile of mobile communication devices served by base stations 121, 122 and 123 and service network 140 are monitored (201). Mobile communication device 101 initiates a handover from source base station 122 to target base station 121 (202). The mobility profiles of mobile communication devices being served by target base station 121 are processed to determine if any candidate mobile communication device(s) are good candidates for an outbound handover from target base station 121 service area (203). If so, an outbound handover may occur with one or more candidate mobile communication device(s) to a neighboring base station (204). If not, or in conjunction with the outbound handover(s) of step 204, the initial handover request of mobile communication device 101 is processed to move mobile communication device 101 from source base station 122, to a target base station 121.

After the handover is complete, mobile communication device 101 exchanges communications with target base station 121 in accordance with a communications protocol, such as CDMA, CDMA 2000, GSM, WiFi, WiMAX, or any combination or variation thereof. Target base station 121 exchanges the communications over a new backhaul link 131 between target base station 121 and service network 140. Backhaul link 131 could comprise a T-1 or Ethernet link, or some other type of backhaul link. Service network 140 exchanges the communications with communication network 150. In this manner, the burden on the target backhaul link 131 between target base station 121 and service network 140 is reduced and performance degradation due to reduced capacity on the target backhaul link 131 is avoided.

Figure 3:
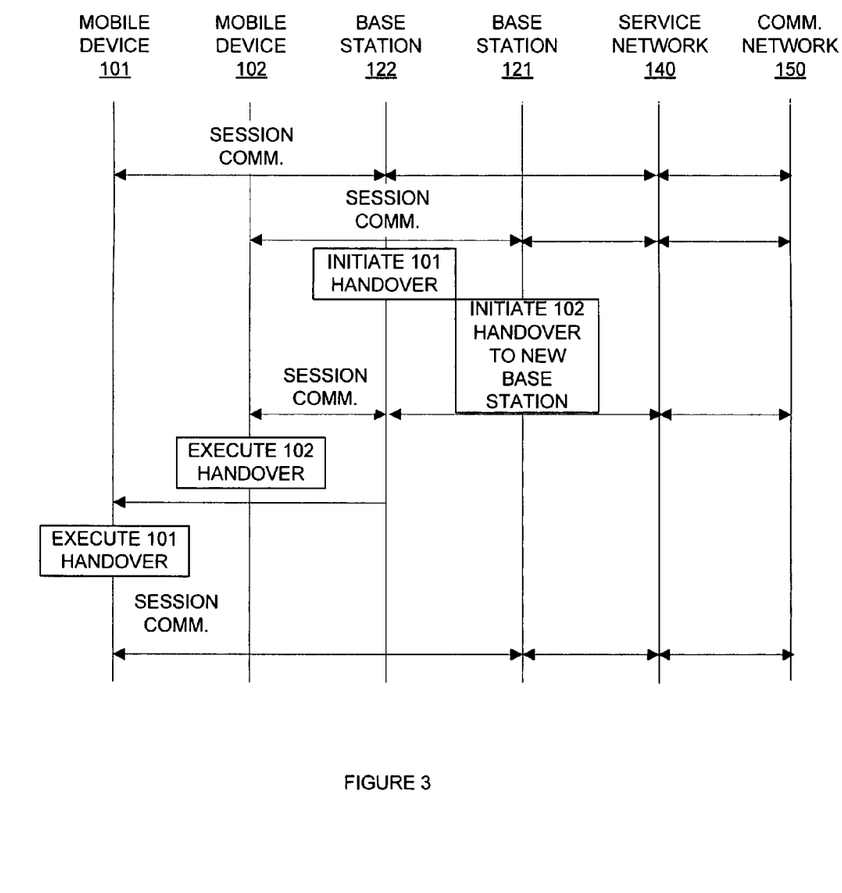
FIG. 3 is a flow diagram that describes initiating handovers in an embodiment.

FIG. 3 illustrates a flow diagram that describes an embodiment whereby process 200, as shown in FIG. 2, is employed by base station 121 and 122. In operation, mobile communication device 101 initially exchanges session communications with base station 122 and mobile communication device 102 exchanges session communications with base station 121. The session communications comprise voice, video, or data communications. Other mobile communication devices (not shown) may also exchange communications with base stations 121 and 122. Base station 122 exchanges the communications with service network 140 over backhaul link 132. Base station 121 exchanges the session communications with service network 140 over backhaul link 131. Service network 140 exchanges the communications with communication network 150.

Mobile communication device 101 requests a handover to target base station 121. Backhaul link 131 may near full capacity, potentially degrading network performance. To avoid performance degradation, a handover of one or more of the mobile communication devices communicating with base station 121 could be initiated based on the mobility profiles of mobile communication device(s) in shared power boundaries with base station 121. In this example, target base station 121 determines that mobile communication device 102 is in a shared power boundary between base stations 121 and 122. Target base station 121 also determines that mobile communication device 102 is relatively immobile for a predetermined period of time or has a mobility profile less than the mobility profile of mobile communication device 101 for a predetermined period of time. Target base station 121 hands-over mobile communication device 102 to base station 122, The handover would reduce the load on backhaul link 131 after the mobile communication device 101 executes the inbound handover from source base station 122 to target base station 121.

In this embodiment, base station 121 employs process 200 to determine whether or not to initiate a handover of mobile communication device 102 to a base station 122 having a shared power boundary with base station 121.

It should be noted that other embodiments are contemplated and within the scope of the invention. For example, in another embodiment, during operation, base station 121 may monitor the current condition of backhaul link 131 to determine if any outbound handovers are necessary. The backhaul link condition comprises the available capacity of backhaul link 131 or the present load on backhaul link 131, as well as other conditions of backhaul link 131. In another embodiment, the service network may monitor the condition of the backhaul links and when handovers are initiated, if the handovers would cause the conditions of a backhaul link to degrade or become overloaded, the service network would query the target base station for mobility information of candidate mobile communication devices for outbound handover(s) in order to optimize the load balancing of the backhaul links and ensure quality of service to users. These activities may be accomplished by one or more base stations, one or more mobile devices or the service network, individually or in any combination.

In another contemplated embodiment, target base station 121 may also determine the additional load of the handover of mobile communication device 101 to the backhaul link 131. The target base station may also monitor the mobility profiles and the load requirements of all mobile communication devices it is currently servicing in order to determine whether outbound handover(s) are necessary and which mobile communication devices should be switched to another base station based on their location within a shared power boundary, their relative mobility profile and the load requirements on the backhaul link of the applications they are currently running. Any combination of these factors may be used to determine whether and which users should be to switch base stations. Also, the monitoring of user locations within shared power boundaries, mobility profiles and load requirements of current applications in use, may be accomplished individually or in combination by mobile communication device(s), base station(s) and the service network.

In yet another contemplated embodiment, there may be priority users. In such an environment, a priority user may initiate a handover. The target base station or service network may then determine users with lower priority within shared power boundaries of the target base station that have been relatively immobile or have low mobility profiles for a predetermined time period that are candidates for outbound handover(s) to neighboring base stations. Likewise, if a user is attempting a handover into a target base station, priority user (s) may trump or be a factor in decisions regarding switching them to a different base station. Priority users may be users of a certain customer level, such as a purchased higher customer priority level that perhaps a CEO of a company may purchase; users running priority applications, such as data downloading or video streaming; users running having a certain type of communication, such as perhaps a multi-user conference call, a 911 call, etc. Priority user information may be used in combination with mobility information to determine handovers.

In one example, a mobile communication device participating in a real-time session, such as a voice or video session, is assigned priority over a mobile communication device participating in a data session, such as web browsing. To avoid dropping the real-time session, the mobile communication device participating in the data session is selected for the handover.

In another example, an array of priorities may be predetermined to assist with selecting the appropriate mobile communication device for handovers along with mobility profile information. For instance, all real-time sessions could be assigned priority over non-real time sessions. Within this subset of real-time sessions, voice sessions could be assigned priority over streaming video or audio sessions. In this manner, mobile communication devices engaged in non-real time sessions will be selected for handovers before mobile communication devices engaged in real time sessions are selected. Likewise, mobile communication devices engaged in streaming video or audio sessions will be selected for handovers before mobile communication devices engaged in voice sessions are selected. It should be understood that the converse could occur. For instance, low priority sessions could be selected for handovers to poorly performing base stations in order to improve the performance delivered to higher priority sessions.

In another example, the status of the applications running on each mobile communication device is considered when selecting the appropriate mobile communication device for the handover. Deep packet inspection could be employed to determine the status of the applications. For instance, one mobile communication device may be engaged in a file transfer, such as a music download, while another mobile communication device may be engaged in web browsing. The status of the file transfer could be determined via deep packet inspection and the status considered when selecting the appropriate mobile communication device for the handover. Rather than handover a mobile communication device nearing the end of a file transfer, the mobile communication device engaged in web browsing could be selected instead. Other criteria may be used. Again these factors may be utilized in conjunction with mobility profiles to determine mobile communication devices for handovers.

It should be noted that the handover could be a soft handover, a hard handover, or an inter-technology handover. Other types or handovers are also possible. It should also be understood that process 600 could be employed by mobile communication device 601 or 602, base station 621, 622, or 633, or service network 640, or any combination thereof.

Figure 4:
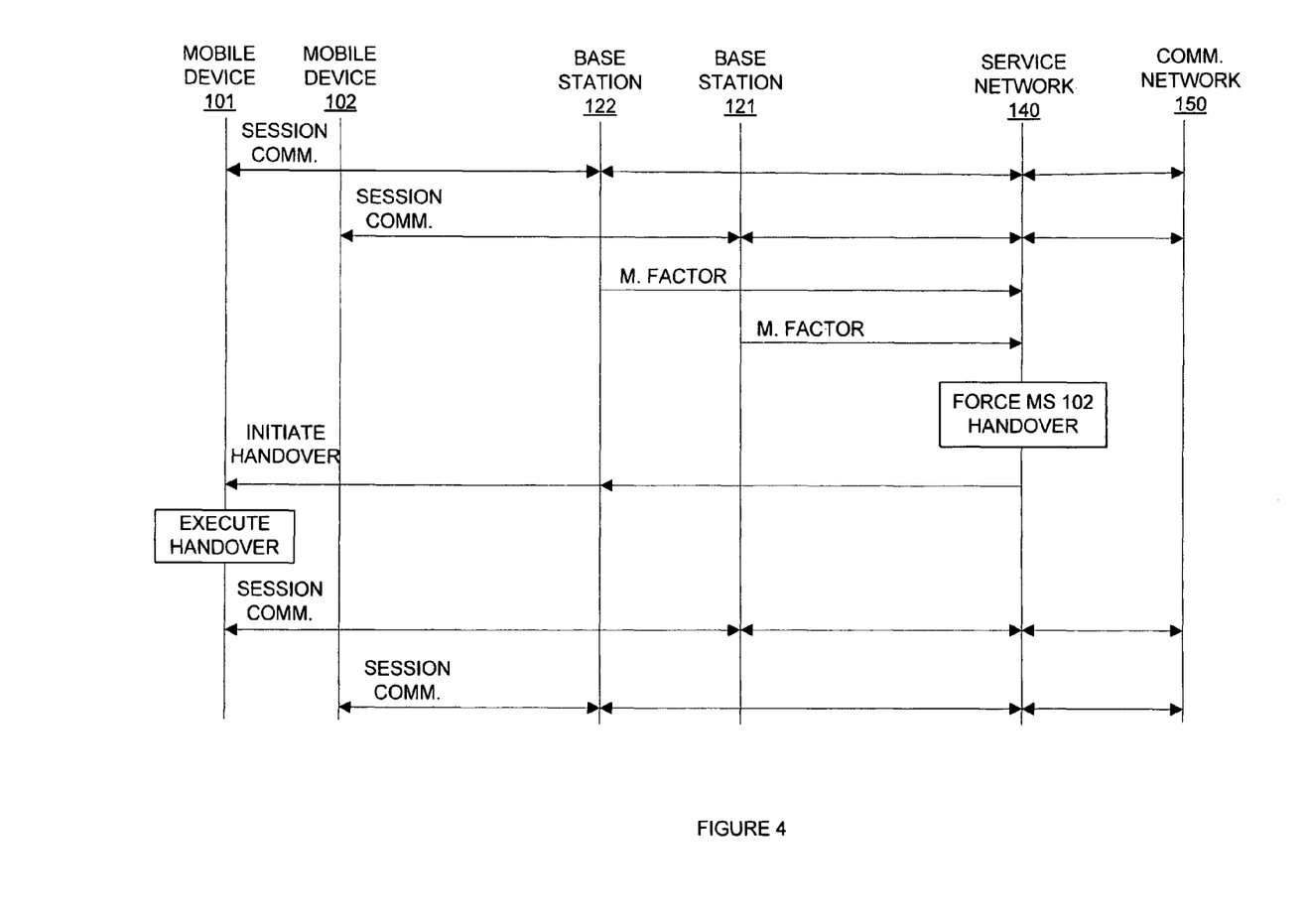
FIG. 4 is a flow diagram that describes initiating handovers in an embodiment.

FIG. 4 illustrates a flow diagram that describes another embodiment whereby process 200 is employed by service network 140. In this embodiment, service network 140 receives and processes the mobility profiles of mobile communication devices being served by base stations 121 and 122 to determine if a handover of mobile communication device 101 from base station 121 to base station 122 should be initiated in order to ensure backhaul link 131 is not overloaded after mobile communication device 101 completes its handover to base station 121 from base station 122.

As shown in FIG. 4, mobile communication device 101 initially exchanges session communications with base station 122 and mobile communication device 102 exchanges session communications with base station 121. The session communications comprise voice, video, or data communications. Base station 122 exchanges the communications with service network 140 over backhaul link 132 and base station 121 exchanges the communications with service network 140 over backhaul link 131. Service network 140 exchanges the communications with communication network 150.

Referring still to FIG. 4, base station 121 transmits the mobility profile information of mobile communication devices within its shared power boundaries with neighboring base stations to service network 140. Likewise, base station 122 transmits the mobility profile information of the mobile communication devices within its shared power boundaries with neighboring base stations to service network 140. It should be understood that in an alternative embodiment, rather than the base stations transmitting this information, service network 140 could query the base stations for the mobility profile information of mobile communication devices in shared power boundaries as necessary in order to ensure backhaul load balancing following a handover request, as one or more backhaul links near full capacity.

Referring still to FIG. 4, service network 140 processes the mobility profile information to determine which mobile communication devices within a target base station's shared power boundaries are candidates for outbound handovers. This determination could be based upon a relative comparison of the mobility of each device served by the target base station. In one option, a comparison is made between the mobility profiles of the devices served by the target base station and that of mobile communication device 101 to determine which devices have lower mobility profiles than that of device 101. In this example, it is assumed that mobile communication device 102 is selected as the handover candidate.

Upon determining that the handover should be initiated, service network 140 transmits a handover request to mobile communication device 102 to initiate the handover. Mobile communication device 102 executes the handover in response to the request message. After the handover is complete, mobile communication device 102 exchanges communications with base station 122 and mobile communication device, after completing its handover, exchanges session communication with base station 121. Base station 122 exchanges the communications over backhaul link 132 with service network 140 and base station 121 exchanges session communication over backhaul link 131 with service network 140. Service network 140 exchanges the communications with communication network 150.

Figure 5:
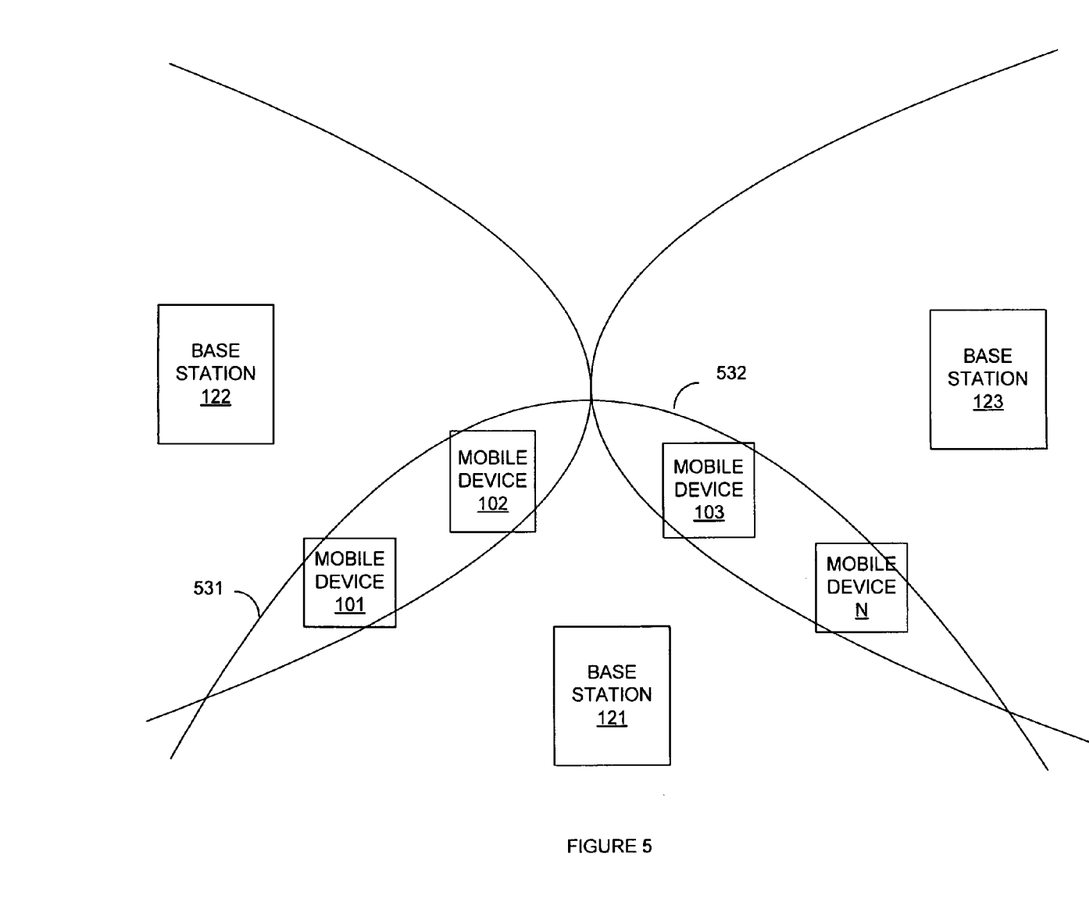
FIG. 5 is a block diagram of an embodiment for managing handovers in shared power boundaries between adjacent base stations.

FIG. 5 illustrates a block diagram for managing handovers in shared power boundaries that describes an exemplary embodiment whereby process 200 is employed by mobile communication device 101. In FIG. 5, mobile communication device 101 initially is exchanging session communications with base station 122. Mobile communication device 101 may be mobile and may move into shared power boundary 531 that is essentially an overlap of power boundaries between base station 122 and base station 121. As mobile communication device 101 moves away from base station 122, it may detect poorer quality of service, as measured by SINR, CINR, RSSI and RTT. As the quality of service degrades, mobile communication device may perform ranging and request a handover to target base station 121.

After receiving a handover request, a determination may be made that backhaul 131 for target base station 121 will be near or exceed its capacity if the inbound handover of mobile communication device 101 occurs. Accordingly, the mobility profile information of mobile communication device(s) 102, 103, N that are currently in shared power boundaries with target base station 121 is processed, in order to determine a candidate mobile communication device(s) for outbound handover(s) to neighboring base stations 122 and 123. N represents one or more mobile communication devices in shared power boundaries for target base station 121.

One or more factors may be considered in selecting candidate(s) for outbound handover(s), such as whether the potential candidate mobile communication device has been relatively immobile for a predetermined period of time, has a lower mobility profile than inbound mobile communication device 101, has a lower user priority than inbound mobile communication device 101, or has a higher backhaul usage requirement than inbound communication device 101, as well as other factors. If one or more candidate mobile communication devices are identified, the associated outbound handover(s) will be initiated and the inbound handover of mobile communication device 101 will begin.

One skilled in the art will note that base station 121 may have more shared power boundaries with other neighboring base stations beyond those shown in the drawings and discussed herein. Moreover, the exemplary embodiments illustrate the one or more outbound handovers between the target and the source base stations. This is merely for simplicity and illustration purposes. Other neighboring base stations may be selected for handovers.

It should be noted that target base station 121, mobile communication devices 101-N and service network 140 may conduct these various steps individually or in any combination. For example, target base station 121 may continually monitor the mobility profile information, user priority information, current applications, and backhaul capacity requirements for mobile communication devices in its service area, as well as the current backhaul conditions and backhaul requirements for any mobile communication devices requesting an inbound handover.

When a mobile communication device requests an inbound handover, the base station may determine whether its backhaul link is able to handle the increased load that would result from the inbound handover. If the inbound handover would result in a backhaul capacity at or above a predetermined threshold, than the target base station may process the mobility profile information of mobile communication devices in its service area that are within shared power boundaries 531 or 532 with neighboring base stations, potentially in conjunction with any of the above other factors, in order to select candidate mobile communication devices for outbound handovers to neighboring base stations.

Alternatively, the service network may perform the monitoring, processing, and determinations. These functions and processes may also be shared between the mobile communication devices, base stations and service network. It should be noted that the service network 140 may also monitor or query any base stations that are potential candidates to accept the outbound handovers regarding the impact on their backhaul links if the handover(s) occur. This information may also be used in the initial handover decision in order to ensure optimized backhaul load balancing and overall service quality and user satisfaction.

Figure 6:
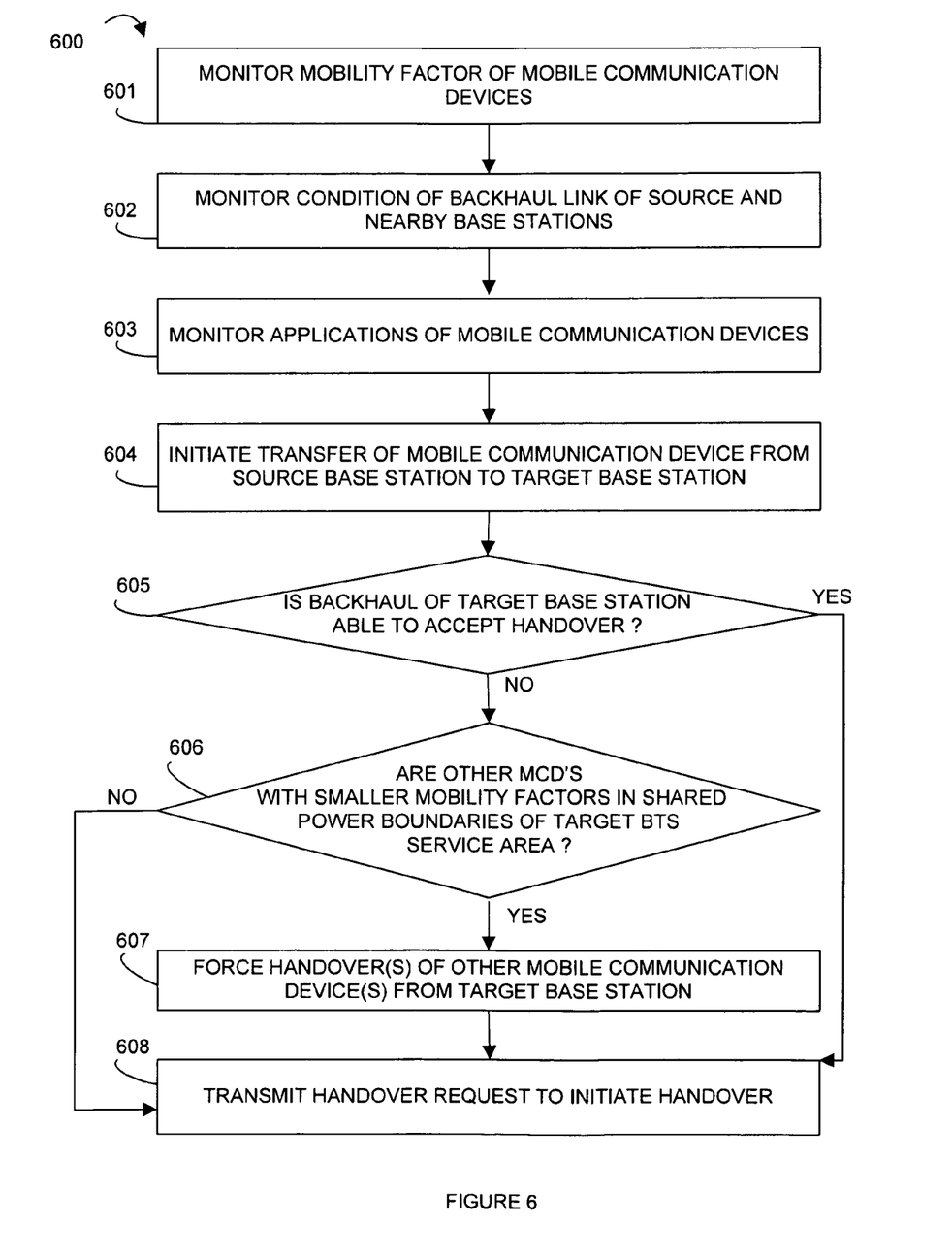
FIG. 6 illustrates a process for managing handovers in an embodiment.

FIG. 6 illustrates a process 600 that may be employed to determine if such outbound handover(s) of one or more mobile communication devices served by target base station 121 should be initiated. It should be noted that process 600 could be employed by a variety of different elements shown in FIGS. 1-5, including mobile communication devices 101, 102, 103 and N; base stations 121, 122 and 123; and service network 140; or any combination thereof.

To begin, the mobility profile of mobile communication devices served by base stations 121, 122 and 123 and service network 140 are monitored (601). The condition of the backhaul links 131, 132, 133 between the base stations and the service network 140 are monitored (602). The applications, user priority and/or backhaul requirements of the mobile communication devices are monitored (603). Mobile communication device 101 initiates a handover from a source base station 122 to a target base station 121 (604). In response to the handover request of mobile communication device 101, a determination is made as to whether the backhaul link of the target base station is able to handle the requirements of the handover (605). If yes, the handover is initiated (608)

If not, a determination is made regarding candidate mobile communication devices in shared power boundaries between the target base station 121 and neighboring base stations that may switch base stations from the target base station to a neighboring base station (606). The selection of one or more candidate mobile communication devices for handover(s) may be based upon the mobility profiles of mobile communication devices within shared power boundaries of target base station, the backhaul requirements of potential candidate mobile communication devices, and potentially the condition of the target outbound base stations' backhaul links, and priority user information for the potential candidate mobile communication devices. If one or more candidate mobile communication devices are selected for handovers, these handovers are initiated (607). The initial requested handover of mobile communication device 101 is transmitted to initiate the handover (608).

Figure 7:
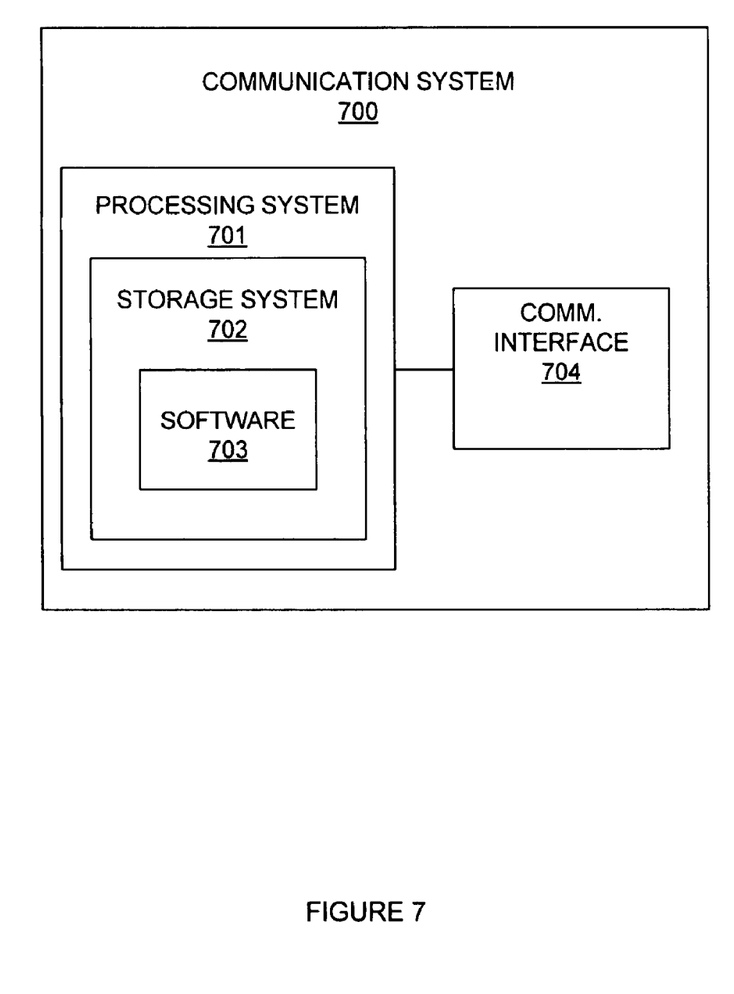
FIG. 7 illustrates a communication system in an embodiment.

Referring now to FIG. 7, communication system 700 includes communication interface 704 and processing system 701. Processing system 701 includes storage system 702. Storage system 702 stores software 703. Processing system 701 is linked to communication interface 704. Communication system 700 could be comprised of a programmed general-purpose computer, although those skilled in the art will appreciate that programmable or special purpose circuitry and equipment may be used. Communication system 700 may be distributed among multiple devices that together comprise elements 701-704.

Communication interface 704 could comprise a network interface, modem, port, transceiver, or some other communication device. Communication interface 704 may be distributed among multiple communication devices. Processing system 701 could comprise a computer microprocessor, logic circuit, or some other processing device. Processing system 701 may be distributed among multiple processing devices. Storage system 702 could comprise a disk, tape, integrated circuit, server, or some other memory device. Storage system 702 may be distributed among multiple memory devices.

Processing system 701 retrieves and executes software 703 from storage system 702. Software 703 may comprise an operating system, utilities, drivers, networking software, and other software typically loaded onto a computer system. Software 703 could comprise an application program, firmware, or some other form of machine-readable processing instructions. When executed by processing system 701, software 703 directs processing system 701 to operate as described herein for communication systems, such as mobile communication devices, base stations, and service networks, as well as other types of communication systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to manage a handover of mobile communication devices between base stations, the method comprising:
   exchanging wireless communications between a first plurality of mobile communication devices and a first base station system;
   processing the wireless communications to determine a plurality of mobility profiles associated with the first plurality of mobile communication devices served by the first base station system;
   receiving a handover request to handover a second mobile communication device from a second base station system to the first base station system;
   processing the plurality of mobility profiles to select a candidate mobile communication device from the first plurality of mobile communication devices for an outbound handover from the first base station system, wherein the selected candidate mobile communication device has less mobility than a mobility of the second mobile communication device; and
   initiating the handover of the selected candidate mobile communication device from the first base station system to another base station system.

2. The method according to claim 1, wherein processing the communications to determine the plurality of mobility profiles comprises performing a ranging process to determine a movement of each of the plurality of mobile communication devices over a time range.

3. The method according to claim 1, further comprising determining a priority of the second mobile communication device and a priority of the selected candidate mobile communication device, and initiating the handover of the selected candidate mobile communication device only if the priority of the second mobile communication device is a higher priority than a priority of the selected candidate mobile communication device, wherein the priority of the second mobile communication device and the priority of the selected candidate mobile communication device are each determined based on a mobility of each wireless communication device and whether each communication device is engaged in a real-time communication session or a non-real time communication session.

4. The method according to claim 3, wherein the priority of the mobile communication device and the priority of the selected candidate mobile communication device are each further determined based on an application type being used by the second mobile communication device and by the selected candidate mobile communication device.

5. The method according to claim 3, wherein the priority of the mobile communication device and the priority of the selected candidate mobile communication device is further determined based on an the backhaul requirements of the mobile communication device and the backhaul requirements of the selected candidate mobile communication device.

6. The method according to claim 1, further comprising performing the handover of the mobile communication device from the second base station system to the first base station.

7. The method according to claim 1, further comprising selecting the candidate mobile communication devices from a plurality of mobile communication devices served by the first base station system based on which of the plurality of mobile communication devices are located within common power boundaries.

8. The method according to claim 1, wherein the other base station system comprises the second base station system.

9. The method according to claim 1, wherein the other base station system comprises a third base station system.

10. The method according to claim 1, wherein processing the communications to determine the plurality of mobility profiles comprises processing signal quality information.

11. The method according to claim 10, wherein the signal quality information comprises a signal to noise ratio.

12. The method according to claim 10, wherein the signal quality information comprises a carrier to noise ratio.

13. The method according to claim 10, wherein the signal quality information comprises a received signal strength indication.

14. The method according to claim 10, wherein the signal quality information comprises a round trip delay time.

15. A method of operating a communication system, the method comprising:
   exchanging wireless communications between a first plurality of mobile communication devices and a first base station system;
   processing the wireless communications to determine a plurality of mobility profiles associated with the first plurality of mobile communication devices served by the first base station system;
   receiving a handover request to handover a second mobile communication device from a second base station system to the first base station system;
   monitoring a backhaul occupancy of the first base station system and a backhaul occupancy of one or more neighboring base station systems;
   determining if the first base station system backhaul will be overloaded after a handover of the mobile communication device from the second base station system;

if the first base station system backhaul will be overloaded following the requested handover, processing the plurality of mobility profiles to select one or more candidate mobile communication devices from the first plurality of mobile communication devices for a handover from the first base station system to one or more neighboring base station systems, wherein the one or more selected candidate mobile communication devices have less mobility than a mobility of the second mobile communication device;

selecting the one or more candidate mobile communication devices from a plurality of mobile communication devices served by the first base station system based on which of the plurality of mobile communication devices are located within common power boundaries of one or more neighboring base station systems;

initiating one or more handovers of the one or more selected candidate mobile communication devices from the first base station system to the one or more neighboring base station systems with backhaul occupancies capable of handling the one or more handovers; and initiating the handover of the second mobile communication device from the second base station system to the first base station system.

16. A communication system for managing handovers of mobile communication devices between base stations, the communication system comprising:

a processing system configured to exchange wireless communications between a first plurality of mobile communication devices and a first base station system; process the communications to determine a plurality of mobility profiles associated with the first plurality of mobile communication devices served by the first base station system; receive a handover request to handover a second mobile communication device from a second base station system to the first base station system; process the plurality of mobility profiles to select a candidate mobile communication device from the first plurality of mobile communication devices for an outbound handover from the first base station system, wherein the selected candidate mobile communication device has less mobility than a mobility of the second mobile communication device; and an interface configured to initiate a handover of the selected candidate mobile communication device from the first base station system to another base station system in response to determining that the handover should be initiated.

17. The communication system of claim 16, wherein the processing system is further configured to perform a ranging process to determine a movement of each of the plurality of mobile communication devices over a time range to determine the plurality of mobility profiles.

18. The communication system according to claim 16, wherein the processing system is further configured to determine a priority of the second mobile communication device and a priority of the selected candidate mobile communication device, and initiate the handover of the selected candidate mobile communication device only if the priority of the second mobile communication device is a higher priority than a priority of the selected candidate mobile communication device.

19. The communication system according to claim 18, wherein the priority of the mobile communication device and the priority of the selected candidate mobile communication device is a function of the application type being used by the mobile communication device and the candidate mobile communication device.

20. The communication system according to claim 18, wherein the priority of the second mobile communication device and the priority of the selected candidate mobile communication device is a function of the bandwidth requirements of the mobile communication device and the bandwidth requirements of the selected candidate mobile communication device.

21. The communication system according to claim 16, wherein the processing system is further configured to select the candidate mobile communication devices from a plurality of mobile communication devices served by the first base station system based on which of the plurality of mobile communication devices are located within common power boundaries.

* * * * *